2/11/86 XR 4,569,888

SR

United States Patent [19]

Muller et al.

[11] Patent Number: 4,569,888

[45] Date of Patent: Feb. 11, 1986

[54] TRANSPARENTIZED PAPER SHEET

[75] Inventors: Peter Muller; Henry Mustacchi, both of Port Washington; Leonard Kreicas, Long Island, all of N.Y.

[73] Assignee: Andrews Paper & Chemical Co., Inc., Port Washington, N.Y.

[21] Appl. No.: 630,442

[22] Filed: Jul. 13, 1984

[51] Int. Cl.⁴ ........................ B32B 27/10; B32B 23/10

[52] U.S. Cl. .................................... 428/481; 428/337; 428/264; 428/482; 428/513; 428/514; 428/522; 428/537.5; 428/918; 428/274; 162/168.1; 162/168.7; 430/181

[58] Field of Search ..................... 428/337, 264, 537.5, 428/513, 514, 522, 918, 481, 482; 162/168.1, 168.7; 430/181

[56] References Cited

U.S. PATENT DOCUMENTS

| | | | |
|---|---|---|---|
| 3,684,551 | 8/1972 | Seiner | 427/152 |
| 4,128,437 | 12/1978 | Ura et al. | 428/481 |
| 4,416,950 | 11/1983 | Muller et al. | 428/513 X |

*Primary Examiner*—Patrick C. Ives
*Attorney, Agent, or Firm*—Kane, Dalsimer, Kane, Sullivan and Kurucz

[57] ABSTRACT

A transparentized paper with a caliper of between 0.001 and 0.015 inch and the process for its preparation is disclosed. A paper web is treated with a liquid mixture of polyesters, acid monoesters of polyols and dicarboxylic acids in non aqueous polaric solvents having admixed therein methylol derivatives of polyamino compounds, with or without a catalyst. The impregnated paper is cured by an in-situ cross-linking reaction immobilizing the impregnated material. A transparentized paper results which is resistant to water, most organic solvents and heat and is useful as tracing material as well as a translucent base for sensitizing with reprographic coatings. The transparentized paper is not resistant to alkali and can be repulped in alkaline medium for recycling. The transparentized paper also exhibits antistatic properties.

13 Claims, 2 Drawing Figures

TRANSPARENTIZED PAPER SHEET

BACKGROUND OF THE INVENTION

1. Field of the Invention

The invention relates to transparentized paper and the process of making such paper.

2. Brief Description of the Prior Art

Transparent papers are widely used in the packaging, printing and engineering field. The purposes for using transparentized paper vary from reduced visual and reprint opacity to the chemical and physical resistance associated with them. Engineering and reproduction applications for transparentized papers require certain physical and chemical characteristics such as caliper ranges of between 0.001 and 0.015 inch, good pencil and ink receptivity for tracing media, combined with a resistance to uneven penetration of coating solutions used in reprographic papers. When these papers are used in drafting, visual brightness is required and high ultraviolet (UV) light translucency is necessary for making good reproductions. In practice, each grade of transparentized paper serves only a particular application. The commercial papers are generally not interchangeable with each particular application. It is also necessary that a transparentized paper have good physical strength to resist handling, good permanence for record keeping and chemical stability. Compositions applied to render the paper transparent should not migrate or volatilize (which would result in the loss of transparency and contamination of interfiled documents).

Paper is a fibrous material with many voids between fibers, which scatter incident light. The physical process of rendering paper transparent consists of filling the voids between the fibers with a material that has a refractive index identical or very close to that of the paper fibers. It should be noted that mineral fillers in papers affect the transparency because of their light absorption and light scattering properties and that papers without mineral fillers are preferred for transparentizing use.

Transparentizing paper is a widely established art and has been heretofore accomplished by impregnating the paper with mineral oils or waxes or polymeric thermoplastic resins, such as polystyrenes, polybutenes, polypropenes, various rosin derivatives, or various polymers or copolymers of acrylics and styrene, with or without plasticizers. The application of such materials to the paper is done by either hot melt applications or by applying organic solvent solutions or aqueous emulsions to the paper. The processing equipment used for applying or treating fibrous material such as paper, varies with the type of application employed. For example, the transparentizing mixture may be applied by extrusion, tub and roller applications. Excess material may be removed by a doctoring off process using scrapers, wire, squeeze rollers, or size press. Where paper is employed for transparentizing, it sometimes is "wet packed" after treatment to improve the distribution of the transparentizing agents in the body of the paper and then after a certain time the "wet packed" paper is passed through a dryer to remove the solvent vehicle. Where the transparentized paper is to be employed for drafting use, the transparentizing treatment is sometimes followed by a surface application with resins and toothing agents such as particles of silica which are harder than graphite.

There are many disadvantages and problems associated with the prior art processes for transparentized paper. High molecular weight resins would be desirable for transparentizing paper because of their physical strength, heat and water resistance, and absence of tendency of the resin to migrate within or out of the finished paper. Such resins, however, can be applied to the paper only with great difficulty since they tend to accumulate near or adjacent the surface of the paper and when impregnation is accomplished the resin is generally unevenly distributed throughout the paper. Thus, the translucency of the product made therefrom is low and is not uniform. Low molecular weight liquid resins of low viscosity or mineral oils readily penetrate the paper and produce a material of high translucency but the finished surface would be soft and would not be pencil resistant. The surface would "ghost" upon erasure. Also, low molecular weight transparentizing agents tend to migrate from the paper to interfiled documents lying adjacent thereto. Further, such low molecular weight resins or low viscosity materials are volatile and cannot be used where the transparentizing paper is subjected to elevated temperature processing equipment, such as xerography machines. The surface of such transparentized materials are often tacky to the touch and therefore are undesirable.

Polymeric transparentizing agents which contain polaric and non-polaric groups in the chain are wetting agents and will distribute more readily through the paper but form a transparentized paper which is too soft to the touch. Further, the transparentizing agent is mobile and easily leached out by water. It is not set in the paper and would not be suitable for the application, for example, of a diazo-sensitizing solution which is coated on the transparentized material. This is because such coating would deeply penetrate. The transparentizing process is generally carried out off the papermaking machine as a converting operation. Since the transparentizing materials generally contain organic solvents which are generally highly volatile aromatic liquids, the solvent vapors present pollution problems, not only to the atmosphere, but also in the area where the evaporation is taking place.

Many transparentized papers discolor when exposed to UV light and this affects the reprint speed.

Transparentized papers often produce excessive curl when coated with diazotype sensitizing solution. Such curl is objectionable when the treated paper is used.

Conventionally transparentized paper, probably due to the dielectric characteristics of the transparentizing resins, tend to accept and hold electrostatic charge during the handling and mechanical processing of the sheets with the result of collecting dust or jamming up automatic processing equipment.

A handling advantage of paper versus polymeric resin films lies in the fact that paper can be folded while film does not lend itself to folding. However, conventionally transparentized paper tends to leave pronounced crease marks when folded. Such crease marks are detrimental to the use of the transparentized paper for making diazo prints because the crease marks appear as dark lines on the print.

Diazotype copies on transparentized paper base often tend to cause print dye bleeding upon print aging. This means that the transparentizing agent in the paper exhibits solvent properties for the azo dye which upon aging moves slowly into the base and forms visible halos around the print lines. Recently, U.S. Pat. No. 3,813,261 disclosed transparentizing through impregnation of fibrous materials with partial ethers of polyols and methylol derivatives of polyamino compounds and thermal resin condensation in situ. This process while leading to highly transparentized sheets, has some shortcomings as the sheets become brittle in lower relative humidity atmospheres and tend to retain electrostatic charges.

U.S. Pat. No. 4,271,227.teaches transparentizing fibrous sheets through impregnation with ethylenically unsaturated ester monomers and catalytically initiated controlled thermal polymerization in situ. The process produces good translucency and water and solvent resistant sheets, which however tend to retain electrostatic charges and have lower folding resistance than the non-transparent sheets. Moreover, tinting dyes in the base are destroyed during the catalytic polymerization process.

In recent years acrylate ester impregnated photo polymerized transparentized paper has been offered which excels by its high degree of translucency. Such sheets however become brittle at low relative humidity, and leave extremely pronounced crease marks after folding. Moreover, they also tend to retain electrostatic charges.

It is an object of the present invention to overcome the disadvantages of heretofore conventionally transparentized paper by providing an improved transparentized paper with a high visual and UV light translucency, with improved tracing surfaces for good acceptance and erasability of pencil and ink lines, with an improved resistance against discoloration when exposed to UV light, with good receptivity of a diazo sensitizing solution and with high resistance to print dye bleeding.

Another object of the invention is to provide a transparentized paper of good performance which is resistant to water, and to common chemical solvents, and which is stable at elevated temperatures when being used in xerography machines.

Still another object of the invention is to provide a transparentized paper which is adapted for use in a variety of applications such as a base for diazo reproduction coatings, a tracing sheet, or a copying sheet in xerography machines.

A further object of the invention is to provide a process for transparentizing paper which can be performed without the need of a solvent and thereby avoids any pollution problems connected therewith.

A further object of the invention is to provide a transparentized paper useful as a diazotype intermediate which can be processed on conventional printing equipment without an objectional curl to the paper.

A further object of the invention is to provide a transparentized paper which does not tend to retain electrostatic charges in handling and processing.

Another object of the invention is to provide a transparentized paper which can be easily folded with a minimum degree of crease marks.

A further object of the invention is to provide a transparentized paper which is resistant to all conventional handling, but can be recycled for repulping by a simple aqueous alkaline pulping.

A further object of the invention is to provide a more economical transparentizing process for paper with readily available and low cost raw materials.

SUMMARY OF THE INVENTION

The invention comprises a transparentized paper sheet having a caliper of from 0.001 to 0.015 inches and which comprises;

a web of randomly dispersed cellulosic fibers, a portion of said fibers having cross-over sites common to adjacent fibers, said web having spaces separating adjacent fibers at sites apart from the cross-over sites; and a transparentizing composition within said spaces, said composition comprising a cross-linked mixture of polyesters and monoesters which are the product of the esterification of aliphatic polycarboxylic acids with a polyol;

said product of the esterification being one wherein from 51 to 95 percent of the carboxylic groups on the acids are esterified.

DETAILED DESCRIPTION OF THE PREFERRED EMBODIMENTS OF THE INVENTION

Figure 1:
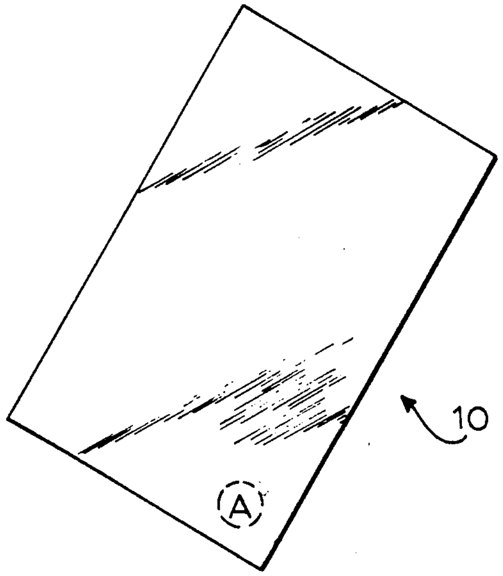
FIG. 1 is a view of an embodiment transparentized paper of the invention.

We have found that mixtures of polyesters and acidic monoesters of polyols and certain polycarboxylic acids which possess free carboxylic and free hydroxylic radicals render a paper web highly translucent after impregnation and cross-linking in-situ. Cross-linking may be effected with alkylated N-methylol derivatives of di- or polyamines, for example melamine derivatives or urea formaldehyde resins of low molecular weight, with or without the presence of an external condensation catalyst. Such a cross-linking reaction does not reduce the transparentizing effect of the polyester composition, but renders the transparentized paper water and solvent fast.

The mixtures of acidic poly- and monoesters are preferably prepared by esterification of aliphatic dicarboxylic acids.

The aliphatic dicarboxylic acids employed to prepare the polyester reactants used in preparing transparentized papers of the invention are acylic and alicyclic compounds, including those represented by the formula:

$$HOOC—R—COOH \quad (I)$$

wherein R represents alkylene or cycloalkylene.

The term "alkylene" as used herein means the divalent moiety obtained upon removal of two hydrogen atoms from a parent hydrocarbon. Representative of alkylene is methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene and isomeric forms thereof.

The term "cycloalkylene" as used herein means the divalent moiety obtained upon removal of two hydrogen atoms from a cycloaliphatic hydrocarbon. Representative of cycloalkylene is cycloethylene, cyclopropylene, cyclobutylene, cyclopentylene, cyclohexylene and isomeric forms thereof.

Dicarboxylic acids of the formula (I) given above are well known compounds as is the method of their preparation. Representative of the dicarboxylic acids of the formula (I) are succinic acid, propylene dicarboxylic acid, adipic acid, sebacic acid, hexahydrophthalic acid, and the like.

Also representative of the aliphatic dicarboxylic acids which may be esterified and employed in transparentizing paper in the present invention are the polymerized fatty acids (dimer acids). They may be characterized as having at least two carboxyl groups, a molecular weight of at least about 325, preferably from about 325 to about 1130 and at least 19 carbon atoms, inclusive. The fatty acids from which they are derived are those having from 3 to 22, preferably from 16 to 22 carbon atoms, inclusive. The preferred acids are illustrated by palmitic, margaric, stearic, n-nonadecylic, palmitoleic, oleic, linoleic, and like acids including mixtures thereof.

Such polymeric polycarboxylic acids are well known as is their preparation; see for example U.S. Pat. Nos. 2,793,219 and 2,793,220. Because of their ready availability and relative ease of polymerization, oleic acid and linoleic acid are the preferred polymerized fatty acids. Mixtures of these two acids are generally found in tall oil fatty acids which are, accordingly, the common source for polymerization to polymerized fatty acids commercially available. Polymerized tall oil provides the preferred dimer fatty acids.

The polyols employed in the preparation of the polyesters are aliphatic polyols having at least two hydroxyl groups and a molecular weight of from about 60 to about 250. Illustrative of such polyols are diols such as ethylene glycol, propylene glycol, 1,4-butanediol, 1,5-pentanediol, neopentyl glycol, 1,6-hexanediol, 1,4-heptanediol, 1,2-octanediol, 1,9-nonanediol, 1,10-decanediol, 1,2-octadecanediol, 2,2,4-trimethyl pentane-1,3-diol and the like; triols such as glycerol, trimethylolethane, trimethylolpropane, trimethylolbutane, 1,2,4-butanetriol, 1,2,5-pentanetriol, 1,2,6-hexanetriol, trimethylol propane mono allyl ether, trimethylol propane mono ethyl ether, and the like; tetrols such as about 1.0 percent by weight of the starting reactants. The heating step may be carried out over a wide range of temperatures, i.e., from about 150° C. to about 300° C. Preferably the heating step is carried out under an inert gaseous atmosphere such as a nitrogen gas atmosphere. During the reaction it is advantageous to remove the water of condensation as it forms. Thus, removal of water may be carried out by conventional techniques well known to those skilled in the art, for example by azeotropic distillation.

The time required to complete the condensation of polycarboxylic acid and aliphatic polyol varies depending on the nature of the reactants, catalyst and reaction temperature used. Progress of the reaction is observable by periodic analysis to determine the acid number of the reaction mixture.

Upon completion of the reaction, the desired polyester may be separated from the reaction mixture by conventional techniques such as, for example, by extraction in solvent, washing and stripping of solvent. Generally the crude reaction mixture contains substantial proportions of excess acid reactant. According to a preferred embodiment of the invention, the excess acid may be allowed to remain in admixture with the polyester product. The resulting product will contain a mixture of poly- and monoester. The presence of residual unreacted minute amounts of unreacted reactants in the finished product appears not to affect its performance. We have also found that especially useful for the objectives of the invention are esters and polyesters of alkane dicarboxylic acids with at least 3 methylene groups as well as of dimer acids and polyols with at least 3 free methylol groups, and mixed polyesters of a mixture of mono- or diglycols or other alkane diols, or trimethylolpolyols in which one methylol radical is etherified. It is believed that the reactions leading to the transparentizing ester mixtures and mixed ester mixtures of the invention proceed in the following manner:

(A) In the case of trimethylol ester mixtures

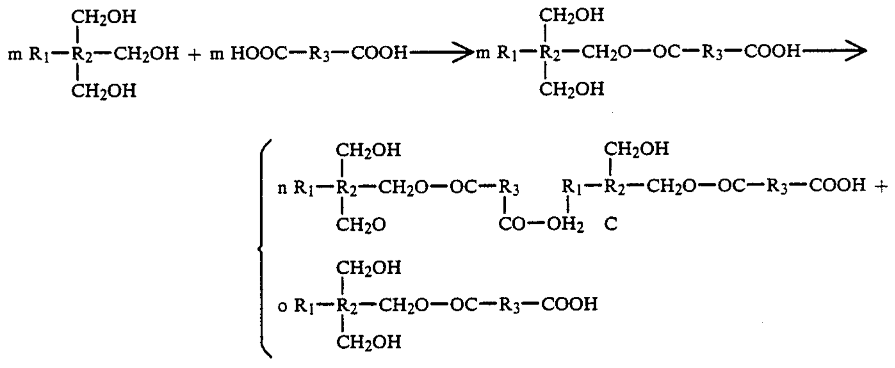

erythritol, pentaerythritol and the like; pentoses such as ribose and the like; hexoses such as sorbitol and the like.

The condensation of aliphatic polycarboxylic acid with aliphatic polyol is effected by admixing the two reactants and heating the admixture. Heating may be carried out in the presence of a catalytic proportion of a condensation catalyst, however lighter colored products may be obtained if the condensation is carried out without the assistance of a catalyst. Representative of condensation catalysts which may be used are zinc acetate and preferably p-toluenesulfonic acid. The catalyst is employed in a catalytic proportion, which is generally within the range of from about 0.0001 to where $3m=2n+o$ and $R_1$=H or Alkyl $R_2$=Alkylene with at least 2 Carbon atoms $R_3$=Alkylene with more than 2 Carbon atoms or

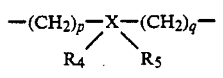

where $R_4$ and $R_5$ are Alkyl and X resulting from the polymerization of two unsaturated fatty acid molecules and p and q are intergers of 1-17.

(B) In the case of mixed diol ester mixtures preferentially $$\left\{\begin{array}{l} m\ HO—R_4—OH + m\ HOOC—R_5—COOH + \\ n\ HO—R_6—OH + n\ HOOC—R_7—COOH \end{array}\right. \longrightarrow$$

$$\left\{\begin{array}{l} m\ HO—R_4—O—OC—R_5—COOH + \\ n\ HO—R_6—O—OC—R_7—COOH \end{array}\right. \longrightarrow$$

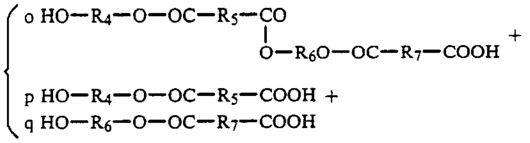

where m+n=2o+p+q and $R_4$: Alkylene with at least 2 Carbon atoms $R_5$: Alkylene with more than 3 Carbon atoms or $R_6$: Alkylene with at least 2 Carbon atoms but different from $R_4$ $R_7$: Identical to $R_5$ or Alkylene with at least 3 Carbon atoms or

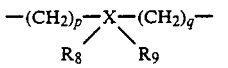

where $R_8$ and $R_9$ are Alkyl and X resulting from the polymerization of two unsaturated fatty acid molecules that form dimer acid and p and q are integers of 1 to 10.

(C) In the case of mixed diol ester mixtures with between 5% and 49% carboxylic radicals left after reactions.

$$\left\{\begin{array}{l} s\ OH—R_4—OH \\ t\ OH—R_6—OH \end{array}\right. + u\ HOOC—R_{(5\ or\ 7)}—COOH \longrightarrow$$

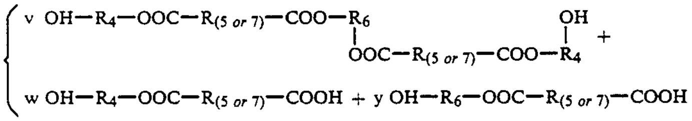

where $R_4$, $R_5$, $R_6$, $R_7$, have the same meaning as before and v+w+y=3s+2t+4u with u=s+t.

The term "alkyl" as used herein means the monovalent moiety obtained upon removal of a single hydrogen atom from a parent hydrocarbon. Representative of alkyl are methyl, ethyl, propyl, butyl, pentyl, hexyl, heptyl, octyl, nonyl, decyl and isomeric forms thereof.

The polyester compositions described above are admixed with a cross-linking agent, with or without an inert solvent and used to impregnate a paper for transparentizing. Sufficient cross-linking agent is added to cure the polyester mixture, reacting with the free carboxylic acid groups, from 5 to 50 percent by weight of the cross-linking reagent based on the weight of the polyester component, is generally adequate for the cross-linking purpose.

Following impregnation of the paper, the desired cross-linking reaction is promoted by heating the impregnated cellulosic to a cross-linking temperature. In general, a cross-linking temperature is one within the range of from about 150° F. to 400° F. for periods of time between 10 seconds or less and 24 hours or more, depending on the particular heating techniques that are involved and the heat exchanging efficiencies that are realized. Heating may be carried out by exposure of the impregnated cellulosics to radiant heaters and like heat sources.

The cross-linking reaction which occurs may be illustrated in the schematic formula:

$$2\ A—X + Z—B—Z \longrightarrow A—B—A$$

(II) (III) (IV)

wherein the compound of formula (II) is a poly- or monoester as described above, X being representative of a carboxyl or a hydorxyl group. The compound of formula (III) is a representative polyfunctional cross-linker wherein B is a divalent organic moiety and Z is selected from the group consisting of amino and hydroxyl.

The cross-linking reagent employed in the method of the invention may be a di- or polyfunctional compound, provided the functional groups are capable of a cross-linking reaction between the free hydroxyl groups or amino groups on the compound (II). Representative of such cross-linking reagents are diols and diamines of the formula (III) given above wherein B is selected from the group consisting of (a) a straight chain, branched chain or cyclic alkylene radical containing from 2 to 12 carbon atoms and in which one or both of the Z groups may be present on a secondary carbon atom, (b) the group: $—(CH_2\text{-})_m—O—Y—O—(CH_2)_n—$ wherein Y is a divalent radical selected from the class consisting of straight chain alkylene groups, branched chain alkylene groups, cyclic alkylene groups and oxydialkylene groups and wherein m and n have the value 2 to 4.

(c) the group:

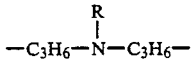

wherein R is a lower alkyl or phenyl group, and (d) the group:

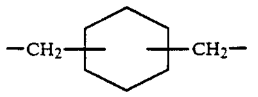

The diamines of class (a) above which may be satisfactorily employed in accordance with the invention are represented by ethylenediamine, 1,3-propanediamine, 1,2-propanediamine, 1,3-butanediamine, 1,5-hexenediamine, 1,3-diaminecyclohexane, 1,4-diaminocyclohexane, 1,3-cyclohexane-bis (methylamine) and the like.

The diamines of class (b) may be 3,3'-(ethylenedioxy) bis(propylamine), 3,3'-(2,2-dimethyltrimethylenedioxy) bis(propylamine), 3,3'-(cyclohexylene-1,4-dimethylenedioxy) bis(propylamine), of the formula:

$$H_2N(CH)_3—O—C_2H_4—O—(CH_2)_3—NH_2$$

and the like.

Likewise the diamines of class (c) may be 3,3-'ethyliminobis (propylamine) 3,3'-phenyliminobis (propylamine) and the like.

Similarly, the diamines of class (d) may be o-, m-, and o-xylene-diamines and the like.

Diols of class (a) above are represented by ethylene glycol, 1,3-propanediol, 1,3-butanediol, 1,4-dihydroxycyclohexane and the like.

The diols of class (b) above may be a poly (alkylene oxide) glycol or the like.

Diols of the class (c) given above are represented by 3,3'-ethyliminobis (propanol) and the like.

Diols of the class (d) given above are represented by 0-, m-, p-xylene diols and the like. .

Preferred cross-linkers (III) of the diol class are represented by dimethylol urea, dimethylol melamine, dimethylol methyltriazine, dimethylol cyclic ethylene urea (DCEU) and the like. The cross-linking reagents may also be represented by polyamines of the formula:

$$H_2N—(CNH—G)_n—NH_2$$

wherein G may be any $C_2$ to $C_{10}$ aliphatic or $C_6$ to $C_{14}$ aromatic radical and n is a whole integer of at least 1. Polyamines that may be included in this category include for example hexamethylene tetramine, diethylene triamine, triethylene tetramine and the like. Other functionally equivalent polyamine compounds such as piperazine and the various substituted piperazines and melamine, in which the nitrogen atoms are part of a heterocyclic molecular structure, may also be utilized as cross-linking reagents in the method of the invention.

Advantageously, the cross-linking reagent may be an aldehyde type of material such as furfural or glyoxal and the like, or a urea-formaldehyde or melamine formaldehyde polymer condensate of the usual resin precursor variety, i.e., mono- or dimethylolurea and the like. It is generally desirable to employ as the cross-linking reagent a polymer which is a urea-formaldehyde or melamine-formaldehyde polymer condensate such as those which have been previously used in the treatment of paper to increase or impart wet strength to the paper fibers. It is believed that such resin cross-linkers form hydrogen bonds between the polymer chains, thereby increasing further the chemical bond strength; see Kirk Othmer, Encyclopedia of Chemistry, Vol. 2, pages 254–255. These urea-formaldehyde and melamine-formaldehyde polymer condensates contain (generally) both free hydroxyl and free amino groups which may function in the desired cross-linking reaction.

We have found that our invention applies best to and can be most easily be used with papers of a caliper range between 0.001 and 0.015 inch. The fiber composition of the paper may vary between rag, cotton, linters and chemical cellulosic fibers from soft or hard wood and the invention is also applicable to paper made from any kind of mixtures of above fibers.

We have also found that the transparentized paper of our invention has excellent receptivity and erasability characteristics for soft and hard pencils and ink. It is receptive to, but prevents penetration of diazotype precoats and sensitizing preparations in aqueous or solvent system. The print dye of diazotype intermediates made on the transparentized paper of our invention does not dissolve in the transparentizing and thus print lines can be physically erased without leaving traces.

Figure 2:
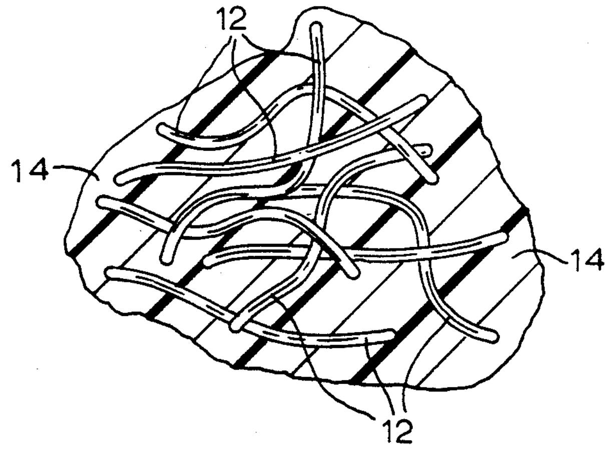
FIG. 2 is an enlarged view of the zone labelled A in the embodiment paper shown in FIG. 1.

The transparentized paper 10 of our invention as shown in FIG. 1 of the accompanying drawings lays flat, is highly and evenly transparent, waterfast and stable at elevated temperatures. It is also highly suited to make translucent copies in plain paper copying machines, such as Xerox copiers and its processing through such equipment is facilitated through its antistatic characteristics. These characteristics are obtained by filling the spaces between fibers 12 of the paper 10 with a cross-linked polyester composition 14 as described above and shown in FIG. 2 of the drawings, an enlarged view of the zone "A" of FIG. 1.

We have also found that the transparentized paper 10 of our invention, while resistant to water and most conventional solvents can be easily recycled for repulping by simple treatment with alkali while conventional transparentizing resins such as polystyrene and polybutenes can be extracted from transparentized paper only by aromatic solvents, and acrylic resins polymerized in situ after paper impregnation even withstand solvent action.

The following examples describe the manner and process of making and using the invention and set forth the best mode contemplated by the inventors for carrying out the invention but are not to be considered as limiting the scope of the invention.

EXAMPLE 1

A monoester-polyester mixture is pepared by heating, under moderate stirring, equimolaric amounts of trimethylol propane and sebacic acid to a temperature of approximately 125° C. until 70% of the original carboxylic radicals are esterified. The progress of esterification is monitored by titration of samples with 0.1 N NaOH solution. 500 g of the obtained monoester-polyester mixture is diluted with: 200 ml isopropyl alcohol and 100 g hexamethoxy methyl melamine is added with enough isopropyl alcohol to bring the total volume to 1000 cc.

On a paper coating machine, a natural 100% rag paper having a caliper of 0.0025" and a basis weight of 52 g/m$^2$, with rosin internal and starch surface sizing, is dipped into the above described solution and immediately thereafter passed through a pair of squeeze rollers which eliminate excess solution from the surface. The paper is then wound up without drying and kept wet packed overnight. The next day the roll is placed in an oven at 70° C. and kept at that temperature for 24 hours. A sample taken from the roll shows that the basis weight has increased to 63 $g/m^2$, lays flat and has become evenly translucent. It is completely dry to the touch and highly flexible. Its surface is receptive to tracing pencils of the range from No. 2 through No. 8H and to India ink. It easily erases without leaving "ghost marks". The roll is converted in part to sheets of 8½×11" and 20 sheets are placed into a Model 3100 LDC Xerox copier and copies made. The paper surface accepts the toner well and sharp prints are obtained without vesicular effect from the heat of the toner fusion. The sheets passed the copier, one by one, without adhering to each other because of electrostatic charge retention. The remainder of the roll is placed into a diazotype coating machine equipped with three airknife coating stations and precoated on the first coating station with a preparation of:

| | Parts |
|---|---|
| water | 400 |
| polyvinyl chloride-acrylate (50% aqueous dispersion) | 600 |
| ammonia | 2 |

and dried thereafter and then sensitized in the second coating station with a preparation of:

| | Parts |
|---|---|
| water | 500 |
| citric acid | 30 |
| ethylene glycol mono butyl ether | 150 |
| isopropyl alcohol | 250 |
| 1-diazo-4-dimethylamino benzene chloride, ½ zinc chloride | 50 |
| 4-chlororesorcinol | 15 |
| m-hydroxyphenyl urea | 30 |
| zinc chloride | 20 |
| silica | 50 |
| rice starch | 20 |
| 20% aqueous solution of polyvinyl alcohol | 200 |

and dried thereafter and backcoated then with a solution of:

| | Parts |
|---|---|
| water | 100 |
| ethanol | 40 |
| tartaric acid | 20 |
| polyvinyl acetate 50% aqueous dispersion and dried to a residual moisture of 3.5% | 40 |

The thus obtained intermediate diazotype paper is exposed behind an original tracing in a diazotype printing machine and developed with ammonia vapors. Deep brown print lines on a clear evenly translucent background are obtained and the print performs very well as a second original. The print lines can be easily erased with a rubber eraser without leaving a trace of the print dye. The print lays flat. When the print is folded and then unfolded again and reprints are made on opaque diazotype paper, the fold does not leave marks on the reprint even when the reprint is made at a speed that leaves a background dye density of 0.5. After one month print aging, print lines still erased with a rubber eraser without leaving traces of the print dye in the base.

When a piece of the transparentized paper was dipped into a 1 N sodium hydroxide solution, and afterwards rinsed with water and dried, the paper had lost its transparency and could be repulped like an ordinary paper sheet.

A transparentized paper with comparative translucency in which conventional polybutene resin was used as the transparentizing agent exhibited a tacky surface and some resin scraped off at the coating roller when the paper was sensitized as a diazotype intermediate generating a spotty and uneven coating. When used as a tracing paper, the pencil take was good but the graphite retention was so strong that pronounced ghost marks were left after erasure with a medium or hard rubber eraser. These shortcomings could only be overcome by greatly reducing the polybutene resin concentration in the paper resulting in a great loss of translucency.

A transparentized paper obtained through impregnation of the paper with tripropylene glycol diacrylate and photopolymerization in the presence of benzophenone as photo catalyst reached equally high translucency as the paper of Example 1, supra., but exhibited brittleness and when used as tracing vellum, pencil application damaged the structure of the paper and after erasure pronounced craze marks were left.

When samples of paper transparentized with polybutene resins or polymerized tripropylene glycol diacrylate were dipped into a 1 N sodium hydroxide solution, and afterwards rinsed and dried, they still contained their transparent-izing resins and were not repulpable.

EXAMPLE 2

Example 1 supra., was repeated except for the composition of the esters which were prepared as follows:

(A) Equimolaric amounts of trimethylol propane and adipic acid were heated under stirring to 107° C. with the addition of 10 g 1-toluenesulfonic acid per 1000 g of the mixture, until 55% of the original carboxylic radicals were esterified.

(B) Equimolaric amount of ethyleneglycol and adipic acid were heated under stirring to 104° C. with the addition of 10 g p-toluenesulfonic acid per 1000 g of the mixture, until 53% of the carboxylic radicals were esterified.

Equal amount of (A) and (B) were used for the paper impregnation.

The paper weight after impregnation and reaction increased from 52 $g/m^2$ to 60.5 $g/m^2$ and exhibited a substantial increase in translucency. Pencil take and erasure were very good.

When the treated paper was sensitized as a diazotype intermediate and the prints were erased after 1 minute of print aging, very slight ghost marks were left indicating that at least some print dye had dissolved in the transparentizing composition.

EXAMPLE 3

Example 1 supra., was repeated except for the composition of the esters which were prepared as follows:

Equimolar amounts of glycerine and adipic acid were heated under stirring to 104° C. with the addition of 1 g 1-toluenesulfonic acid per 1000 g of the mixture, until 55% of the original carboxylic radicals were esterified.

The paper weight after impregnation and reaction had increased from 52 $g/m^2$ to 61.5 $g/m^2$ with very little increase of translucency.

When the treated paper was sensitized as a diazotype intermeidate and prints were made and the prints were erased after 1 month print aging hardly any ghost marks were left indicating that almost none of the print dye had dissolved in the transparentizing composition.

EXAMPLE 4

Example 1 supra., was repeated except for the composition of the esters which were prepared as follows:

1,4-butanediol, trimethylol propane and adipic acid, in the molar ratio of 1:1:2, were heated under stirring to 105° C. with the addition of 10 g p-toluenesulfonic acid per 1000 g of the mixture, until 70% of the original carboxylic radicals were esterified.

The paper weight after impregnation and reaction increased to 66 g/m$^2$ and had become highly and evenly translucent, with good pencil take and erasure properties. When the treated paper was used in a 3100 LDC Xerox copier, the toner was well accepted and sharp prints with a deep black image were obtained without any vesicular effect.

When the treated paper was sensitized as a diazotype intermediate and the prints were erased after 1 month print aging, no ghost marks were left indicating that no print dye had dissolved in the transparentizing composition.

EXAMPLE 5

Example 1 supra., was repeated except for the composition of the esters which were prepared as follows:

Equimolaric amounts of 1,4 butanediol and adipic acid were heated under stirring to 115° C. with the addition of 10 g p-toluenesulfonic acid per 1000 g of the mixture, until 71% of the original carboxylic radicals were esterified.

The paper weight after impregnation and reaction increased from 52 g/m$^2$ to 66.5 g/m$^2$ and it had become highly and evenly translucent. Pencil take and erasure were very good.

When the treated paper was sensitized as a diazotype intermediate and the prints were erased after 1 month print aging, very pronounced ghost marks were left indicating that a substantial amount of the print dye had dissolved in the transparentizing composition.

EXAMPLE 6

Example 1 supra., was repeated except for the composition of the esters which were prepared as follows:

propylene glycol, trimethylolpropane and adipic acid, in the molar ratio of 1:1:2, were heated under stirring to 97° C. with the addition of 10 g p-toluenesulfonic acid per 1000 g of the mixture, until 69% of the original carboxylic radicals were esterified.

The paper weight after impregnation and reaction increased from 52 g/m$^2$ to 65 g/m$^2$ and has become highly and evenly translucent, with good pencil take and erasure properties.

When the treated paper was sensitized as a diazotype intermediate and the prints were erased after 1 month print aging, no ghost marks were left indicating that no print dye had dissolved in the transparentizing composition.

A transparentized paper with a comparative translucency could not be obtained with a conventional low molecular polystyrene resin solution because only too little of the resin entered the voids between the cellulose fibers and impregnated the paper. When higher resin concentrations were used, a good part of the resin stayed on the paper surface without the expected gain in translucency.

EXAMPLE 7

Example 1 supra., was repeated except for the composition of the esters which were prepared as follows:

Equimolaric amounts of diethylene glycol and adipic acid were heated under stirring to 110° C. with the addition of 10 g p-toluenesulfonic acid per 1000 g of the mixture, until 54% of the original carboxylic radicals were esterified.

The paper weight after impregnation and reaction had increased from 52 g/m$^2$ to 62 g/m$^2$ with a moderate transparentizing effect.

When the treated paper was sensitized as a diazotype intermediate and prints were made and the prints were erased after 1 month print aging, pronounced ghost marks were left after erasure indicating that the print dye had dissolved in the transparentizing composition.

EXAMPLE 8

Example 1 supra., was repeated except for the composition of the esters which were prepared as follows:

Equimolar amounts of ethylene glycol and phthalic anhydride were heated to 120° C. under stirring until 56% of the original carboxylic radicals were esterified.

The paper weight increased after impregnation and reaction from 52 g/m$^2$ to 60 g/m$^2$ without any obvious transparentizing effect and it became brittle.

EXAMPLE 9

Example 1 supra., was repeated except for the composition of the esters which were prepared as follows:

1,4-butanediol, trimethylolpropane and adipic acid in the molecular ratio 1:1:2 were heated under stirring to 129° C. with the addition of 10 g p-toluenesulfonic acid per 1000 g of the mixture, until 95% of the original carboxylic radicals were esterified.

The paper weight after impregnation and reaction increased from 52 g/m$^2$ to 66 g/m$^2$ and the paper had become highly and evenly translucent but slightly less than in Example 4. Pencil take and erasure were very good.

When the treated paper was sensitized as a diazotype intermediate and the prints were erased after 1 month print aging, no ghost marks were left indicating that no print dye had dissolved in the transparentizing composition.

EXAMPLE 10

Example 4 supra., was repeated except for the hexamethylol methyl melamine in the transparentizing composition which was replaced by an equal amount of a urea formaldehyde prepolymer as cross-linking agent.

Very similar results were obtained when compared with paper from the procedure of Example 4 supra.

EXAMPLE 11

Example 1 supra., was repeated except of the composition of the esters which were prepared as follows:

Equimolaric amounts of ethylene glycol and maleic anhydride were heated under stirring to approximately 125° C. long enough until 65% of the original carboxylic radicals were esterified. The progress of esterification was monitored by titration of samples with 0.1 m NaOH.

The paper weight after impregnation and reaction had increased from 52 g/m$^2$ to 64 g/m$^2$. Its translucency was only slightly higher than the raw base paper and it exhibited excessive brittleness which excluded its use as tracing vellum or base for diazotype intermediates.

EXAMPLE 12

Example 1 supra., was repeated except for the composition of the esters which were prepared as follows:

Equimolaric amounts of polyethylene glycol (MW 400) and oxalic acid were heated under stirring to 112° C., with the addition of 10 g p-toluenesulfonic acid per 1000 g of the mixture, until the monoester was formed and thus 50% of the original carboxylic radicals were esterified.

The paper weight after impregnation and reaction had increased from 52 $g/m^2$ to 60 $g/m^2$ without any obvious transparentizing effect and it became brittle.

EXAMPLE 13

Example 1 supra., was repeated except for the composition of the esters which were prepared as follows:

Propylene glycol, trimethylolpropane, adipic acid and sebacic acid in the molecular ratio of 2:2:3:1 were heated under stirring to 94° C. with the addition of 10 g p-toluenesulfonic acid per 1000 g of the mixture, until 67% of the original carboxylic radicals were esterified.

The paper weight after impregnation and reaction increased from 52 $g/m^2$ to 61 $g/m^2$ and it became highly translucent. Pencil take and erasure were good. When used in a 3100 LDC Xerox copier, excellent translucent copies with sharp deep black lines and without any vesicular effect were obtained.

When the treated paper was sensitized as a diazotype intermediate and the prints were erased after 1 month print aging, no ghost marks were left indicating that no print dye had dissolved in the transparentizing composition.

EXAMPLE 14

Example 1 supra., was repeated except for the composition of the esters which were prepared as follows:

Equimolaric amounts of EMPOL 1014 (Brand name of dimer acid from Emery Industries, Inc., long chain dicarboxylic acid with 2 or more alkyl side chains, with at least one ethylenic bond and a linkage of 2 chains from the polymerization of 2 unsaturated fatty acid molecules, acid value 194-198) and trimethylolpropane were heated to 125° C. under stirring, until 54% of the original free radicals were esterified.

The paper weight after impregnation and reaction increased from 52 $g/m^2$ to 61 $g/m^2$ and it became highly and evenly translucent and did not lose its physical strength. When the treated paper was sensitized as a diazotype intermediate and the prints were erased after 1 month print aging, no ghost marks were left indicating that no print dye had dissolved in the transparentizing composition.

EXAMPLE 15

Example 1 supra., was repeated except for the composition of the esters which were prepared as follows:

Equimolar amounts of polyethylene glycol (MW 400) and adipic acid were heated under stirring to 97° C. with the addition of 10 g p-toluenesulfonic acid per 1000 g of the mixture, until 54% of the original carboxylic radicals were esterified.

The paper weight after impregnation and reaction had increased from 52 $g/m^2$ to 63.4 $g/m^2$ without hardly increasing its translucency.

When the treated paper was sensitized as a diazotype intermediate and prints were made and the prints were erased after 1 month print aging very strong ghost marks were left after erasure indicating that a substantial part of the print dye had dissolved in the transparentizing composition.

EXAMPLE 16

Example 1 supra., was repeated except for the base which was replaced by a white 100% sulfite paper having a caliper of 0.0034" and a basis weight of 100 $g/m^2$, with internal rosin size and containing no mineral fillers.

After impregnation and reaction the paper weight increased from 100 $g/m^2$ to 125 $g/m^2$.

In all other respects the treated paper performed very similar to the paper obtained from Example 1.

EXAMPLE 17

Example 13 supra., was repeated except for the transparentizing composition and its application to the paper.

The transparentizing composition was applied undiluted (without isopropyl alcohol), and not by dipping the paper and removing the excess by squeezing rollers, but with a gravure roller to apply 14 $g/m^2$ of transparentizing composition.

The results obtained were very similar to the ones obtained from Example 13.

EXAMPLE 18

Example 1 supra., was repeated except for the composition of the esters which were prepared as follows:

Propylene glycol, ethylene glycol, adipic acid, in the molecular ratio of 1:1:2 were heated under stirring to 118° C. with the addition of 10 g p-toluene sulfonic acid per 1000 g of the mixture, until 63% of the original carboxylic radicals were esterified.

The paper weight after impregnation and reaction increased from 52 $g/m^2$ to 63 $g/m^2$ and it became highly translucent. The paper was found, on conventional handling and on folding, to show a minimum degree of crease marks.

The paper had good pencil and ink take erasure of the drawn lines was very good.

When the treated paper was sensitized as a diazotype intermediate and then the prints were erased after 1 month print aging, no ghost marks were left indicating that no print dye had dissolved in the transparentizing composition.

EXAMPLE 19

Example 1 supra., was repeated except for the composition of the esters which were prepared as follows:

trimethylol propane and hexahydrophthalic anhydride, in the molecular ratio of 1:1 were heated under stirring to 106° C. until 95% of the original carboxylic radicals were esterified.

The transparent paper obtained showed similar properties to those of Example 1 with reference to translucency, receptivity to pencils and ink, erasure of lines without leaving ghost marks, acceptance of toner in print making on a Xerox copier, sensitizing with a diazo-type solution and resistance of migration of the print dye in the transparentizing composition.

EXAMPLE 20

Example 1 supra., was repeated except for the composition of the esters which were prepared as follows:

3 mol 2,2,4-trimethyl pentane 1,3-diol, 1 mol trimethylpropane and 4 mol adipic acid with the addition of 1% p-toluenesulfonic acid were heated to 110° C. long enough until 75% of the original carboxylic radicals were esterified.

The transparent paper obtained showed similar properties to those of Example 1 with reference to translucency receptivity to pencils and ink, erasure of lines without leaving ghost marks, acceptance of toner in print making on a Xerox copier, sensitizing with a diazo-type solution and resistance to migration of print dye into the transparentizing composition.

EXAMPLE 21

Example 20 supra., was repeated except that the polyester-monoester solution mixture was evenly applied to a sheet of 100% rag base paper of a basis weight of 52 $g/m^2$, and metered with a wire bar to deposit 22 $g/m^2$ liquid mixture. After application of the solution the sheet was placed in oven of 100° C. Cross-linking occurred readily and a dry, highly transparent sheet was obtained which in its performance was very similar to the transparentized paper of Example 20, supra.

EXAMPLE 22

Example 1 supra., was repeated except for the composition of the esters which were prepared as follows:

trimethylol propane -mono allyl ether and hexahydrophthalic anhydride, in the molecular ratio of 1:1 were heated under stirring to 106° C. until 95% of the original carboxylic radicals were esterified.

The transparent paper obtained showed similar properties to those of Example 1 with reference to translucency, receptivity to pencils and ink, erasure of lines without leaving ghost marks, acceptance of toner in print making on a Xerox copier, sensitizing with a diazo-type solution and resistance of migration of the print dye in the transparentizing composition.

What is claimed:

1. A transparentized paper sheet having a caliper of from 0.001 to 0.15 inches and which comprises;

a web of randomly dispersed cellulosic fibers, a portion of said fibers having cross-over sites common to adjacent fibers, said web having spaces separating adjacent fibers at sites apart from the cross-over sites; and a transparentizing composition within said spaces, said composition comprising a cross-linked mixture of polyesters and monoesters which are the product of the esterification of aliphatic polycarboxylic acids with equimolar proportions of a polyol;

said product of the esterification being one possessing unreacted, crosslinkable hydroxy groups and wherein from 51 and 95 percent of the carboxylic groups on the acids are esterified.

2. The paper of claim 1 wherein a total content of polyesters and acidic monoesters of between 5% and 60% based on cellulosic fiber content.

3. A transparentized paper of claim 2 in which the polycarboxylic acids are selected from those of the formula:

HOOC—R—COOH wherein R represents one of aklylene and cycloalkylene.

4. The paper of claim 3 wherein R is alkylene of 1-18 carbon atoms.

5. The paper of claim 4 wherein R is alkylene of 3 to 12 carbon atoms.

6. The paper of claim 3 wherein R is of the formula:

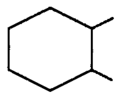

7. The paper of claim 3 wherein R is of the formula:

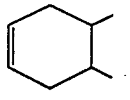

8. The paper of claim 2 in which the polycarboxylic acid is a dimer acid.

9. The paper of claim 8 in which the dimer acid is of the formula $$HOOC-(CH_2)_m-\underset{R_1\;\;R_2}{x}-(CH_2)_n-COOH$$

wherein $R_1$ and $R_2$ are each alkyl radicals with 1-17 carbon atoms; m+n are integers of 10-18 and x is the moiety which results from the polymerization of 2 unsaturated fatty acid molecules that form dimer acid.

10. The paper of claim 2 wherein the polyol is selected from the group consisting of trimethylol propane, glycerine and butanetriol, or their mono alkyl or allyl ethers.

11. The paper of claim 2 wherein the polyol is selected from the group consisting of those of the formula:

$$HOCH_2-R_1-\underset{OH}{R_2}-R_3$$

wherein $R_1$ is alkylene with 1-11 carbon atoms; $R_2$ is CH and $R_3$ is H or alkyl of 1-10 carbon atoms; and $$HCH_2-R_4-\underset{OH}{CH}-R_5$$

wherein $R_4$ is —C $R_6R_7$—; $R_6$ and $R_7$ are each H, $CH_3$, $C_2H_5$ or $C_3H_7$; $R_5$ is —C $R_8R_9R_{10}$; and $R_8$, $R_9$, $R_{10}$ are each H, $CH_3$, $C_2H_5$ or $C_3H_7$.

12. The paper of claim 2 wherein the polyol is selected from the group consisting of ethylene glycol, diethylene glycol, propylene glycol and dipropylene glycol.

13. A transparentized paper of claim 2 in which the cross-linking agent is selected from the group consisting of hexamethoxymethyl melamine and urea formaldehyde prepolymer.

* * * * *

UNITED STATES PATENT AND TRADEMARK OFFICE

CERTIFICATE OF CORRECTION

PATENT NO. : 4,569,888

DATED : February 11, 1986

INVENTOR(S) : Peter Muller et al

It is certified that error appears in the above-identified patent and that said Letters Patent is hereby corrected as shown below:

Col. 7, line 3; - "intergers" should read -- integers -- .

Col. 8, line 23; - "hydorxyl" should read -- hydroxyl -- .

Col. 9, lines 22-23; - 3,3-'ethyliminobis" should read -- 3,3'-ethyliminobis -- .

Col. 12, line 67; - "intermeidate" should read -- intermediate -

Col. 14, line 58; - "except of" should read -- except for -- .

Col. 16, line 43; - "ink take erasure" should read -- ink take and erasure -- .

Col. 17, line 56; - "51 and 95" should read -- 51 to 95 -- .

Col. 17, line 60; - before the word "based" insert -- is -- .

Signed and Sealed this

*Twenty-third* Day of *September 1986*

[SEAL]

*Attest:*

DONALD J. QUIGG

*Attesting Officer* *Commissioner of Patents and Trademarks*